(12) United States Patent
Stark

(10) Patent No.: US 9,727,499 B2
(45) Date of Patent: Aug. 8, 2017

(54) HARDWARE FIRST COME FIRST SERVE ARBITER USING MULTIPLE REQUEST BUCKETS

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 767 days.

(21) Appl. No.: 14/074,469

(22) Filed: Nov. 7, 2013

(65) Prior Publication Data
US 2015/0127864 A1    May 7, 2015

(51) Int. Cl.
*G06F 13/16* (2006.01)
*G06F 13/362* (2006.01)
*G06F 13/364* (2006.01)

(52) U.S. Cl.
CPC ........ *G06F 13/1663* (2013.01); *G06F 13/364* (2013.01); *G06F 13/3625* (2013.01)

(58) Field of Classification Search
CPC . G06F 13/1663; G06F 13/364; G06F 13/3625
See application file for complete search history.

(56) References Cited

U.S. PATENT DOCUMENTS

| 4,672,536 A | * | 6/1987 | Giroir | G06F 13/36 710/241 |
| 8,959,249 B1 | * | 2/2015 | Love | G06F 3/0611 710/6 |
| 2006/0248250 A1 | * | 11/2006 | Sarkar | G06F 13/364 710/243 |
| 2007/0168569 A1 | * | 7/2007 | Bonwick | G06F 3/0611 710/5 |
| 2015/0026403 A1 | * | 1/2015 | Ish | G06F 12/0868 711/118 |

\* cited by examiner

*Primary Examiner* — Nimesh G Patel
(74) *Attorney, Agent, or Firm* — Imperium Patent Works LLP; T. Lester Wallace; Mark D. Marrello

(57) ABSTRACT

A First Come First Server (FCFS) arbiter that receives a request to utilize a shared resource from a plurality of devices and in response generates a grant value indicating if the request is granted. The FCFS arbiter includes a circuit and a storage device. The circuit receives a first request and a grant enable during a first clock cycle and outputs a grant value. The grant enable is received from a shared resource. The grant value communicated to the source of the first request. The storage device includes a plurality of request buckets. The first request is stored in a first request bucket when the first request is not granted during the first clock cycle and is moved from the first request bucket to a second request bucket when the first request is not granted during a second clock cycle. A granted request is cleared from all request buckets.

19 Claims, 22 Drawing Sheets

COMMAND-PUSH-PULL (CPP) DATA BUS
STRUCTURE

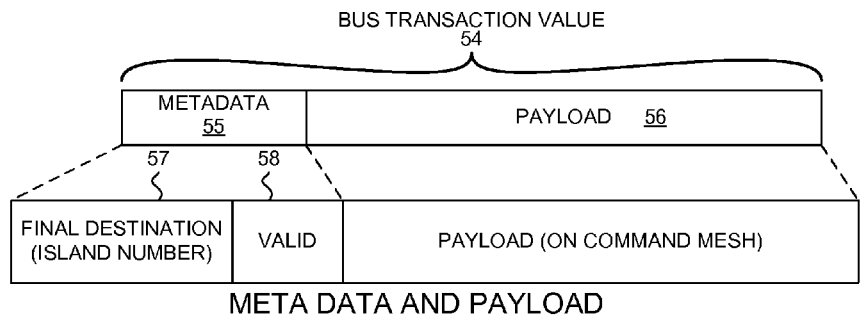

META DATA AND PAYLOAD

FIG. 3

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 4

| FIELD | WIDTH | DESCRIPTION |
| --- | --- | --- |
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 5

| FIELD | WIDTH | DESCRIPTION |
| --- | --- | --- |
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 6

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 7

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 8

ME ISLAND

MU ISLAND

ROUTER

PICO ENGINE POOL

PICO ENGINE GROUP ARBITER

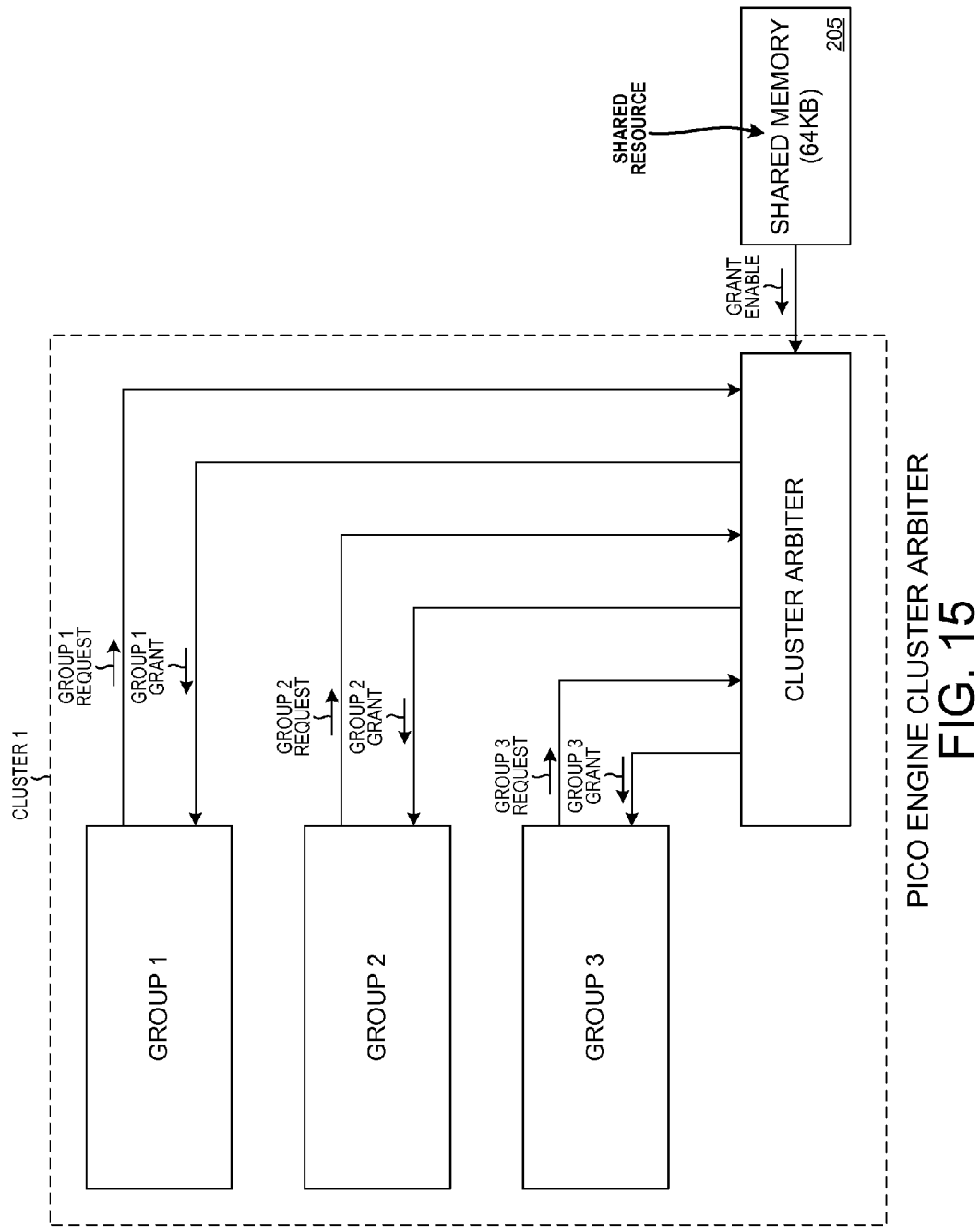

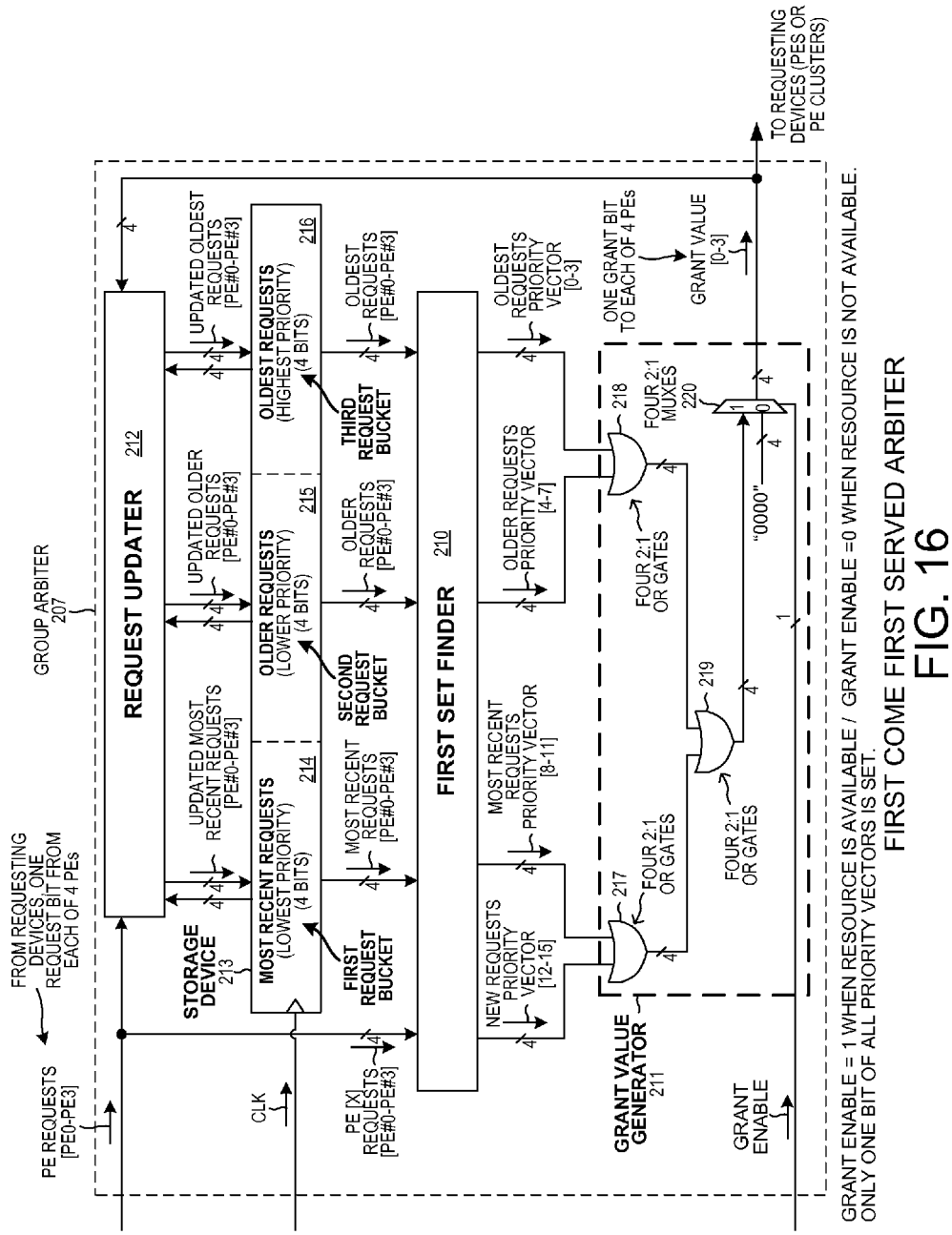

FIRST SET FINDER

FIRST SET FINDER

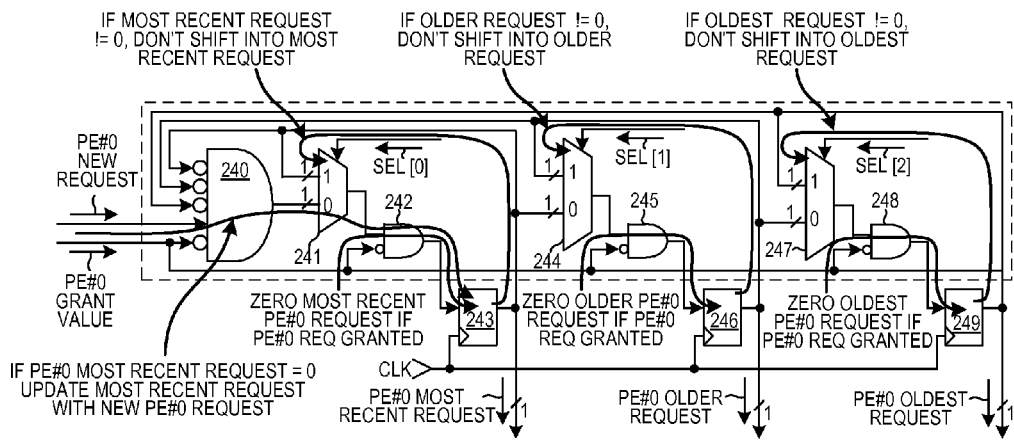
REQUEST UPDATER OPERATIONAL DIAGRAM
FIG. 19
| MOST RECENT REQUESTS [PE#0-PE#3] | OLDER REQUESTS [PE#0-PE#3] | OLDEST REQUESTS [PE#0-PE#3] | SELECT [0-2] |
|---|---|---|---|
| XXXX | XXXX | 0000 | 000 |
| XXXX | 0000 | DOESN'T EQUAL 0000 | 001 |
| 0000 | DOESN'T EQUAL 0000 | DOESN'T EQUAL 0000 | 011 |
| DOESN'T EQUAL 0000 | DOESN'T EQUAL 0000 | DOESN'T EQUAL 0000 | 111 |
X = DON'T CARE
REQUEST UPDATER LOGIC TABLE
FIG. 20
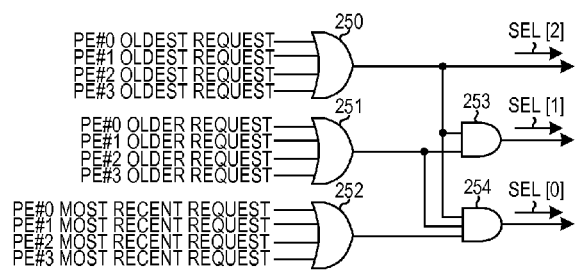
SELECT SIGNAL GENERATION CIRCUIT
FIG. 21

| CYCLE | NEW REQUESTS | MOST RECENT REQUESTS BUCKET | OLDER REQUESTS BUCKET | OLDEST REQUESTS BUCKET | SHARED RESOURCE AVAILABLE | GRANTED REQUEST |
|---|---|---|---|---|---|---|
| C0 | NONE | EMPTY | EMPTY | EMPTY | NO | NONE |
| C1 | PE#3 | EMPTY | EMPTY | EMPTY | NO | NONE |
| C2 | PE#3 | PE#3 | EMPTY | EMPTY | NO | NONE |
| C3 | PE#3<br>PE#2 | EMPTY | PE#3 | EMPTY | NO | NONE |
| C4 | PE#3<br>PE#2 | PE#2 | EMPTY | PE#3 | NO | NONE |
| C5 | PE#3<br>PE#2 | EMPTY | PE#2 | PE#3 | NO | NONE |
| C6 | PE#0<br>PE#3<br>PE#2 | EMPTY | PE#2 | PE#3 | NO | NONE |
| C7 | PE#0<br>PE#3<br>PE#2 | PE#0 | PE#2 | PE#3 | YES | PE#3 |
| C8 | PE#0<br>PE#1<br>PE#2 | PE#0 | PE#2 | EMPTY | NO | NONE |
| C9 | PE#0<br>PE#1<br>PE#2<br>PE#3 | PE#1 | PE#0 | PE#2 | YES | PE#2 |
| C10 | PE#0<br>PE#1<br>PE#3 | PE#1 | PE#0 | EMPTY | YES | PE#0 |
| C11 | PE#1<br>PE#3 | PE#3 | PE#1 | EMPTY | YES | PE#1 |
| C12 | PE#3 | EMPTY | PE#3 | EMPTY | YES | PE#3 |
| C13 | NONE | EMPTY | EMPTY | EMPTY | YES | NONE |

FIRST COME FIRST SERVE ARBITER OPERATION

FIG. 24

| CYCLE | NEW REQUESTS | MOST RECENT REQUESTS BUCKET | OLDER REQUESTS BUCKET | OLDEST REQUESTS BUCKET | SHARED RESOURCE AVAILABLE | GRANTED REQUEST |
|---|---|---|---|---|---|---|
| C0 | NONE | EMPTY | EMPTY | EMPTY | NO | NONE |
| C1 | PE#0 PE#1 PE#2 PE#3 | EMPTY | EMPTY | EMPTY | NO | NONE |
| C2 | PE#0 PE#1 PE#2 PE#3 | PE#0 PE#1 PE#2 PE#3 | EMPTY | EMPTY | NO | NONE |
| C3 | PE#0 PE#1 PE#2 PE#3 | EMPTY | PE#0 PE#1 PE#2 PE#3 | EMPTY | NO | NONE |
| C4 | PE#0 PE#1 PE#2 PE#3 | EMPTY | EMPTY | PE#0 PE#1 PE#2 PE#3 | NO | NONE |
| C5 | PE#0 PE#1 PE#2 PE#3 | EMPTY | EMPTY | PE#0 PE#1 PE#2 PE#3 | YES | PE#0 |
| C6 | PE#1 PE#2 PE#3 | EMPTY | EMPTY | PE#1 PE#2 PE#3 | NO | NONE |
| C7 | PE#1 PE#2 PE#3 | EMPTY | EMPTY | PE#1 PE#2 PE#3 | YES | PE#1 |
| C8 | PE#2 PE#3 | EMPTY | EMPTY | PE#2 PE#3 | YES | PE#2 |
| C9 | PE#3 | EMPTY | EMPTY | PE#3 | YES | PE#3 |
| C10 | NONE | EMPTY | EMPTY | EMPTY | YES | NONE |

FIRST COME FIRST SERVED ARBITER OPERATION

FIG. 25

HARDWARE FIRST COME FIRST SERVE ARBITER USING MULTIPLE REQUEST BUCKETS

TECHNICAL FIELD

The described embodiments relate generally to the use of an arbiter to allocate a shared resource and more specifically to the use of a hardware first come first serve arbiter using multiple request buckets to allocate access to a shared resource.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing atomic operations on the packets and associated packet data, and transmitting packets. Processors on the integrated circuit are called upon to perform processing functions that include using lookup tables stored in on-chip memories to find data structures that store information pertaining to different types of packets. A processor on the integrated circuit may also be called upon to determine and to log updated packet count and byte count information into appropriate tables in memory. As throughput requirements increase, ways of adding processing power are sought.

In one specific example, a network processor integrated circuit uses the flexible and expandable IXP2800 architecture. The IXP2800 architecture allows multiple high-speed processors (referred to as microengines) to access the same memory resources via a common command/push/pull bus. Due to use of the IXP2800 architecture and multiple microengines, increased processing power is brought to bear on the tasks of identifying data structures using lookup algorithms. If more throughput is required, then more microengines can be employed. If less throughput is required, then fewer microengines can be employed. The NFP-3XXX and NFP-6XXX families of network processor integrated circuits available from Systems, Inc. of Santa Clara, Calif. include a selection of IXP2800-based network processor integrated circuits having different numbers of microengines.

SUMMARY

An Island-Based Network Flow Processor (IB-NFP) includes a plurality of islands that are interconnected by a configurable mesh Command/Push/Pull (CPP) data bus. A first of the islands includes multiple processors. Each processor may require access to the same shared resource. A First Come First Serve (FCFS) arbiter using multiple request buckets is provided herein to efficiently arbitrate access the shared resource.

In a first novel aspect, the FCFS arbiter includes a circuit and a storage device. The circuit receives a first request and a grant value during a first clock cycle and outputs a grant value. The grant value is received from a shared resource and is communicated to the source of the first request. The storage device includes a plurality of request buckets. The first request is stored in a first request bucket when the first request is not granted during the first clock cycle and is shifted from the first request bucket to a second request bucket when the first request is not granted during a second clock cycle. A granted request is cleared from all request buckets.

In a second novel aspect, the circuit included in the FCFS arbiter includes a first set finder, a grant value generator, and a request updater. The first set finder receives the first request received during the first clock cycle and a second request during a second clock cycle and generates a priority vector. The grant value generator receives the priority vector and in response generates the grant value. The request updater receives the grant value and in response shifts the first request from the first request bucket to the second request bucket.

In a third novel aspect, the circuit included in the FCFS arbiter includes a first set finder, a grant value generator, and a request updater. The first set finder receives the first request received during the first clock cycle and a second request during a second clock cycle and generates a priority vector. The grant value generator receives the priority vector and in response generates the grant value. The request updater receives the grant value and in response removes the first request from each of the plurality of request buckets.

In a fourth novel aspect, the FCFS arbiter does not use or include a counter.

In a fifth novel aspect, the FCFS performs the following steps: (a) receives a first request during a first clock cycle (the first request is to utilize a shared resource); (b) receives a grant value during the first clock cycle, wherein the grant value indicates if the shared resource is available; (c) determines if the shared resource is available; (d) determines if the first request is the highest priority request received; (e) generates a grant value during the first clock cycle based at least in part on (c) and (d), wherein the grant value indicates if the first request is granted; (f) storing the first request in a first request bucket of a storage device during the first clock cycle if the first request is not granted; and (g) shifting the first request from the first request bucket to a second request bucket of the storage device during a second clock cycle if the first request is not granted during the second clock cycle.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is diagram of a bus transaction value communicated across the CPP data bus.

FIG. 4 is a table listing the parts of the command payload of the bus transaction value of FIG. 3, when the bus transaction value is a command sent across the command mesh of the CPP data bus.

FIG. 5 is a table listing the width and description of each field within the payload of a bus transaction value sent across the pull-id mesh of the CPP data bus.

FIG. 6 is a table listing the width and description of each field within the payload of a bus transaction value sent across the data0 or data1 mesh of the CPP data bus.

FIG. 7 is a table listing the width and description of each field within the data payload of a pull transaction.

FIG. 8 is a table listing the width and description of each field within the data payload of a push transaction.

FIG. 15 is an expanded diagram of Cluster 1 shown in FIG. 13.

FIG. 16 is a more detailed diagram of First Come First Serve (FCFS) arbiter 207 as shown in FIG. 13.

FIG. 17A is part of larger FIG. 17.

FIG. 17B is part of larger FIG. 17.

FIG. 19 is an operational diagram of one portion of Request Updater 212 shown in FIG. 18.

FIG. 20 is a table illustrating the logic performed by Request Updater 212.

FIG. 21 is a diagram of the Request Updater Logic Circuit that generates the select values SEL[0:2] shown in FIG. 18.

FIG. 24 is a temporal table illustrating a first example of how received requests flow through request buckets across multiple cycles.

FIG. 25 is a temporal table illustrating a second example of how received requests flow through request buckets across multiple cycles.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
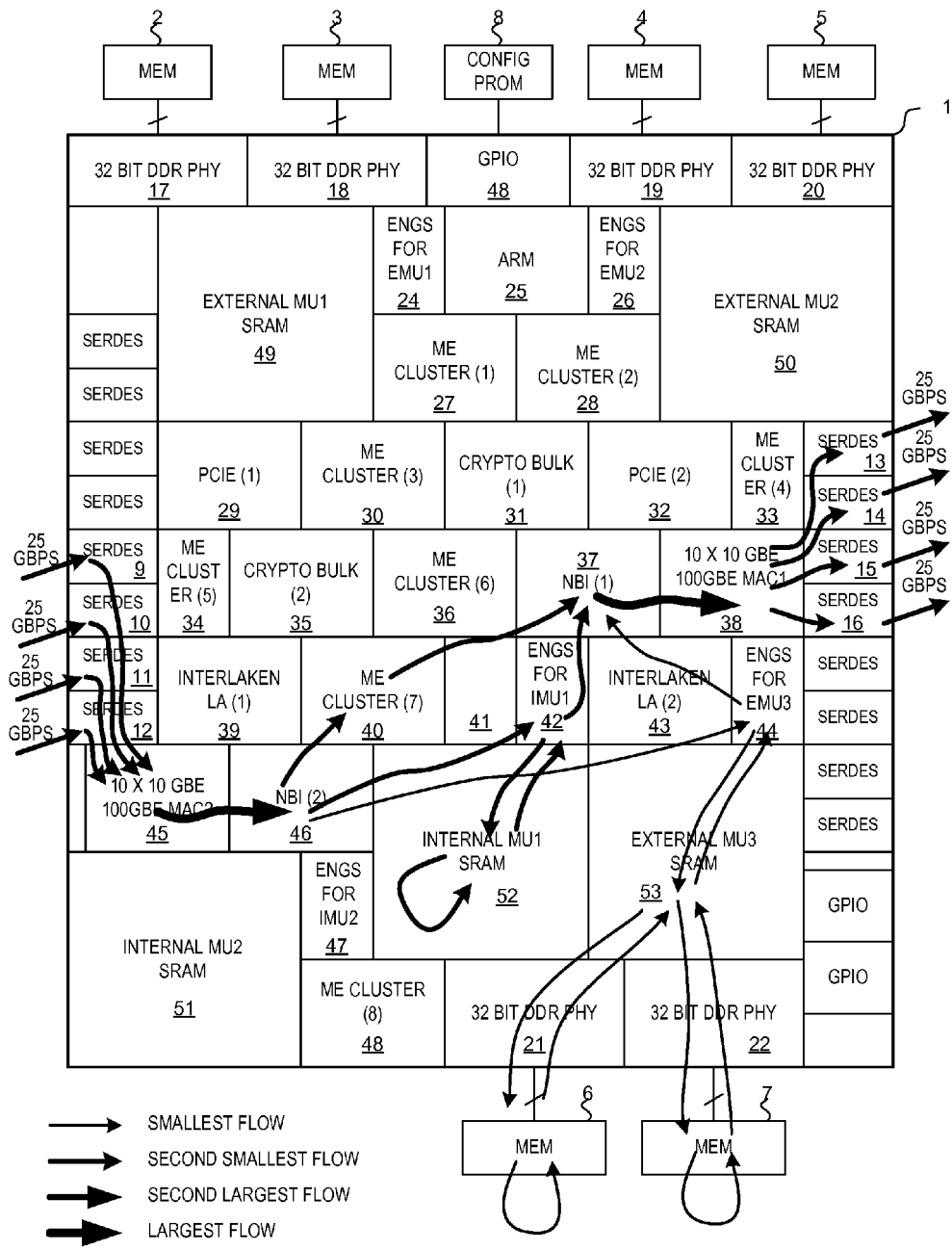
FIG. 1 is a top-down diagram of an Island-Based Network Flow Processor (IB-NFP) integrated circuit 1 and associated memory circuits 2-7 in an MPLS router application.

FIG. 1 is a top-down diagram of an Island-Based Network Flow Processor (IB-NFP) integrated circuit 1 and associated memory circuits 2-7 in an MPLS router application. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads.

SerDes circuits 9-12 are the first set of four SerDes circuits that are used to communicate with an external network via optical cables. SerDes circuits 13-16 are the second set of four SerDes circuits that are used to communicate with a switch fabric (not shown) of the router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 23 is used to access external PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 1 illustrate an operational example of IB-NFP integrated circuit 1 within the MPLS router. 100 Gbps packet traffic is received onto the router via an optical cable (not shown), flows through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to ingress NBI (Network Bus Interface) island 46. In addition to the optical cable that supplies packet traffic into the IB-NFP integrated circuit from the router, there is another optical cable that communicates packet traffic in the other direction out of the IB-NFP integrated circuit and to the router.

For each packet received onto the IB-BPF in the example of FIG. 1, the functional circuitry of ingress NBI island 46 examines fields in the header portion to determine what storage strategy to use to place the packet into memory. In one example, NBI island 46 examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP. NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is tightly coupled to microengines in the ME island 40. The ME island 40 determines header modification and queuing strategy for the packet based on the packet flow (derived from packet header and contents) and the ME island 40 informs a second NBI island 37 of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the ingress NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The payload portions of fast-path packets are stored in internal SRAM in MU block 52, whereas the payload portions of exception packets are stored in external SRAM in external DRAMs 6 and 7.

ME island 40 informs second NBI island 37 where the packet headers and the packet payloads can be found and provides the second NBI island 37 with an egress packet descriptor for each packet. The egress packet descriptor indicates a queuing strategy to be used on the packet. Second NBI island 37 uses the egress packet descriptor to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Twelve virtual output ports are provided in the example of FIG. 1.

Figure 2:
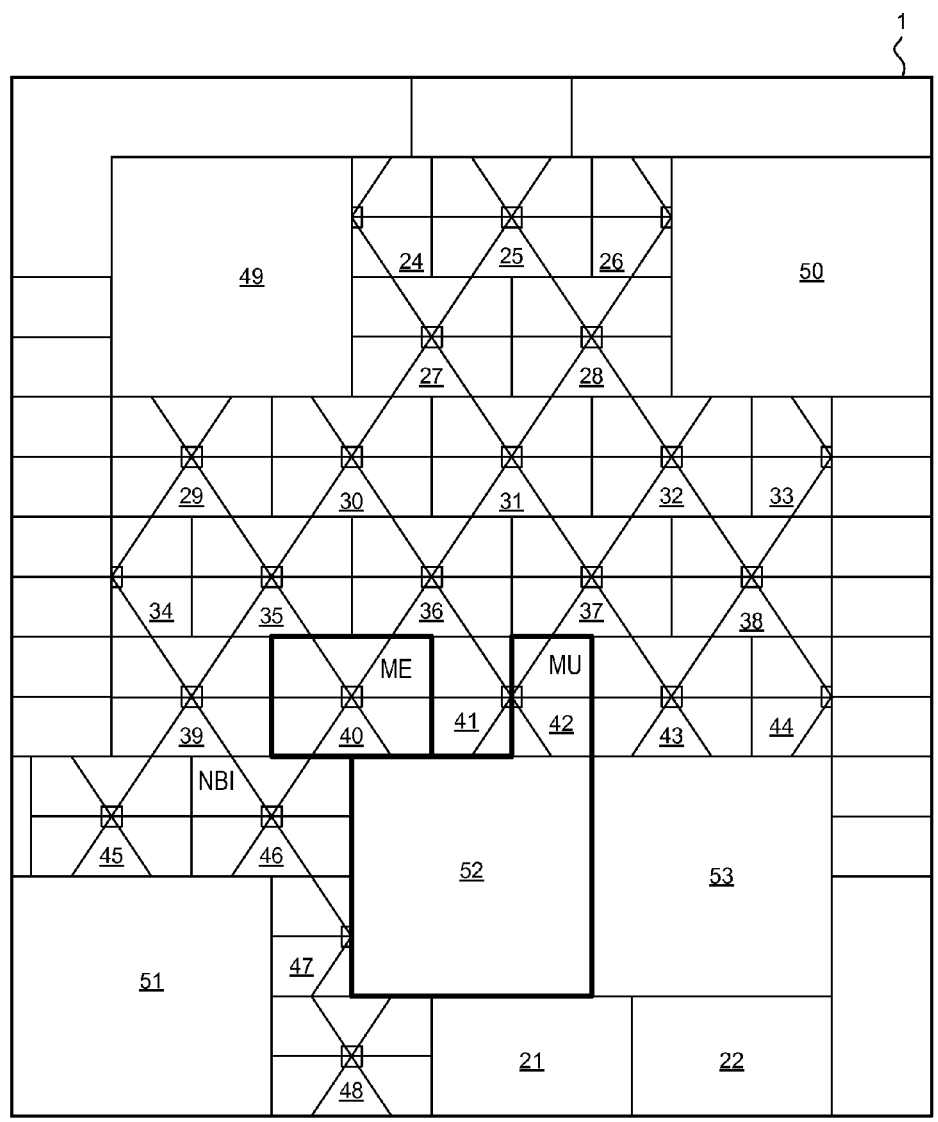
FIG. 2 shows the Command-Push-Pull (CPP) data bus structure that interconnects functional circuitry in the islands of FIG. 1.

General Description of the CPP Data Bus: FIG. 2 shows the Command-Push-Pull (CPP) data bus structure that interconnects functional circuitry in the islands of FIG. 1. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion to form the staggered pattern illustrated in FIG. 2. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

General Description of a Write That Results in a Pull: In one example of a CPP bus transaction, a microengine (a master) on ME island 40 uses the data bus interface of ME island 40 to perform a write operation to a hardware engine (a target) on MU half island 42, where the MU island 42 responds by performing a pull operation. To do this, the microengine on the ME island 40 uses the data bus interface to output a bus transaction value onto the command mesh of the CPP data bus. The format of the bus transaction value is as set forth in FIG. 3. A bus transaction value 54 includes a metadata portion 55 and a payload portion 56 as shown. The metadata portion 55 includes a final destination value 57 and a valid bit 58.

The functional circuitry that receives the bus transaction value and the data to be written is referred to as the "target" of the write operation. The write command is said to be "posted" by the master onto the command mesh. As indicated in FIG. 3, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master to the appropriate target, in this case to a hardware engine on MU island 42. All bus transaction values on the command mesh that originate from the same island that have the same final destination value will traverse through the configurable command mesh along the same one path all the way to the indicated final destination island.

A final destination island may include more than one potential target. The 4-bit target field of payload portion indicates which one of these targets in the destination island it is that is the target of the command. In the case of MU island 42, this 4-bit field indicates one of several hardware engines of the MU island 42. The 5-bit action field of the payload portion indicates that the command is a write. The 14-bit data reference field is a reference usable by the master to determine where in the master the data is to be found. The address field indicates an address in the target where the data is to be written. The length field indicates the amount of data.

The target (a hardware engine of MU island 42) receives the write command from the command mesh and examines the payload portion of the write command. From the action field the hardware engine in MU island 42 determines that it is to perform a write action. To carry out this action, the hardware engine (i.e., posts) a bus transaction value called a pull-id onto the pull-id mesh. FIG. 3 shows the format of the overall bus transaction value, and FIG. 5 shows the format of the payload. The final destination field of the metadata portion indicates the island where the master (in this case, a microengine on the ME island 40) is located. The target port field identifies which sub-circuit target it is within the target's island that is the target of the command. In this example, the target island is the MU island 42 so the sub-circuit is a hardware engine on the MU island. The pull-id is communicated through the pull-id mesh back to ME island 40.

The master in the ME island receives the pull-id from the pull-id mesh and uses the content of the data reference field of the pull-id to find the data. In the overall write operation, the master in the ME island knows the data it is trying to write into the MU island. The data reference value that is returned with the pull-id is used by the master in the ME island as a flag to match the returning pull-id with the write operation the ME had previously initiated.

The master on ME island 40 responds by sending the identified data to the target on MU island 42 across one of the data meshes data0 or data1 as a "pull" data bus transaction value. The term "pull" means that the data of the operation passes from the master (a microengine on the ME island) to the target (a hardware engine on the MU island). The term "push" means that the data of the operation passes from the target to the master. The format of the "pull" data bus transaction value sent in this sending of data is also as indicated in FIG. 3. The format of the payload portion in the case of the payload being pull data is as set forth in FIG. 7. The first bit of the payload portion is asserted. This bit being a digital high indicates that the transaction is a data pull as opposed to a data push. The target on MU island 42 then receives the data pull bus transaction value across the data1 or data0 mesh. The data received by the hardware engine as the data for the write is the content of the data field (the data field of FIG. 7) of the pull data payload portion.

FIG. 6 is a generic description of the data payload, and FIG. 7 is a description of the data payload when the first bit of the data payload indicates the data payload is for a pull transaction. FIG. 8 is a description of the data payload when the first bit of the data payload indicates that payload is for a push transaction.

General Description of a Read That Results in a Push: In another example, a master (for example, a microengine on ME island 40) uses the data bus interface of island 40 to perform a read operation from a target (for example, a hardware engine on MU island 42), where the target responds by performing a push operation. The microengine circuitry in ME island 40 uses the data bus interface of island 40 to output (to "post") a bus transaction value onto the command mesh bus of the configurable mesh CPP data bus. In this case, the bus transaction value is a read command to read data from the target hardware engine in MU island 42. The format of the read command is as set forth in FIGS. 3 and 4. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data.

The target (a hardware engine of MU island 42) receives the read command and examines the payload portion of the command. From the action field of the command payload portion the target determines that it is to perform a read action. To carry out this action, the target uses the address field and the length field to obtain the data requested. The target then pushes the obtained data back to the master across data mesh data1 or data0. To push the data, the target outputs a push bus transaction value onto the data1 or data0 mesh. FIG. 3 sets forth the format of the overall push bus transaction value and FIG. 8 sets forth the format of the payload portion of this push bus transaction value. The first bit of the payload portion indicates that the bus transaction value is for a data push, as opposed to a data pull. The master (the microengine of ME island 40) receives the bus transaction value of the data push from the data mesh bus. The master in the ME island then uses the data reference field of the push bus transaction value to associate the incoming data with the original read command, and from the original read command determines where the pushed data (data in the date field of the push bus transaction value) should be written into the master. The master then writes the content of the data field into the master's memory at the appropriate location.

Figure 9:
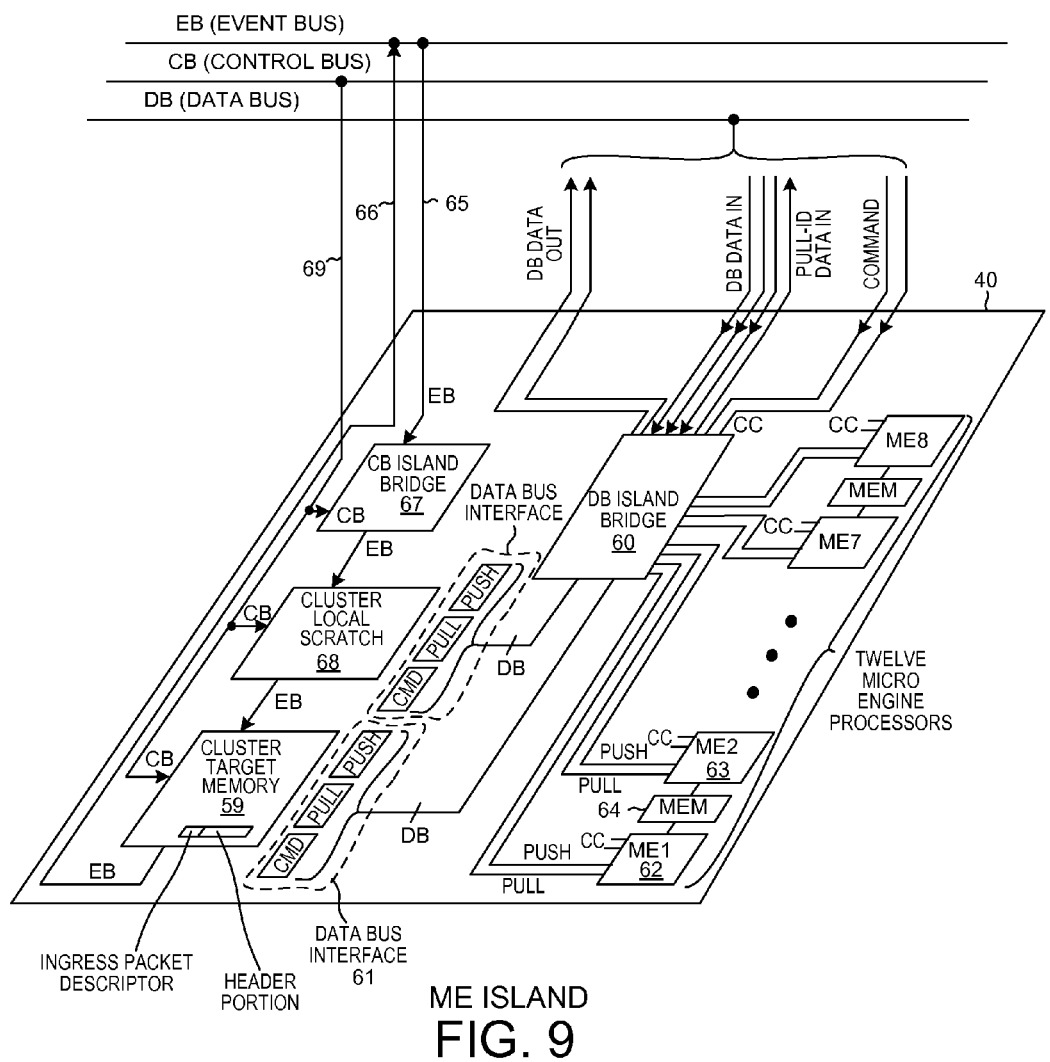
FIG. 9 is a simplified diagram of microengine (ME) island 40 of the IB-NFP integrated circuit of FIG. 1.

ME Island: FIG. 9 is a diagram of the microengine (ME) island 40. In the operational flow of FIG. 1, packet headers and the associated preclassification results are DMA transferred from the ingress NBI island 46 across the configurable mesh data bus and into the Cluster Target Memory (CTM) 59 of ME island 40. A DMA engine in the ingress NBI island 46 is the master and CTM 59 in ME island 40 is the target for this transfer. The packet header portions and the associated ingress packet descriptors pass into the ME island via data bus island bridge 60 and data bus interface circuitry 61. Once in the CTM 59, the header portions are analyzed by one or more microengines. The microengines have, through the DB island bridge 60, a command out interface, a pull-id in interface, a pull-data out interface, and a push data in interface. There are six pairs of microengines, with each pair sharing a memory containing program code for the microengines. Reference numerals 62 and 63 identify the first pair of microengines and reference numeral 64 identifies the shared memory. As a result of analysis and processing, the microengines modify each ingress packet descriptor to be an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Memory errors and other events detected in the ME island are reported via a local event ring and the global event chain back to the ARM island 25. A local event ring is made to snake through the ME island 40 for this purpose. Event packets from the local event chain are received via connections 65 and event packets are supplied out to the local event chain via connections 66. The CB island bridge 67, the cluster local scratch 68, and CTM 59 can be configured and are therefore coupled to the control bus CB via connections 69 so that they can receive configuration information from the control bus CB.

Figure 10:
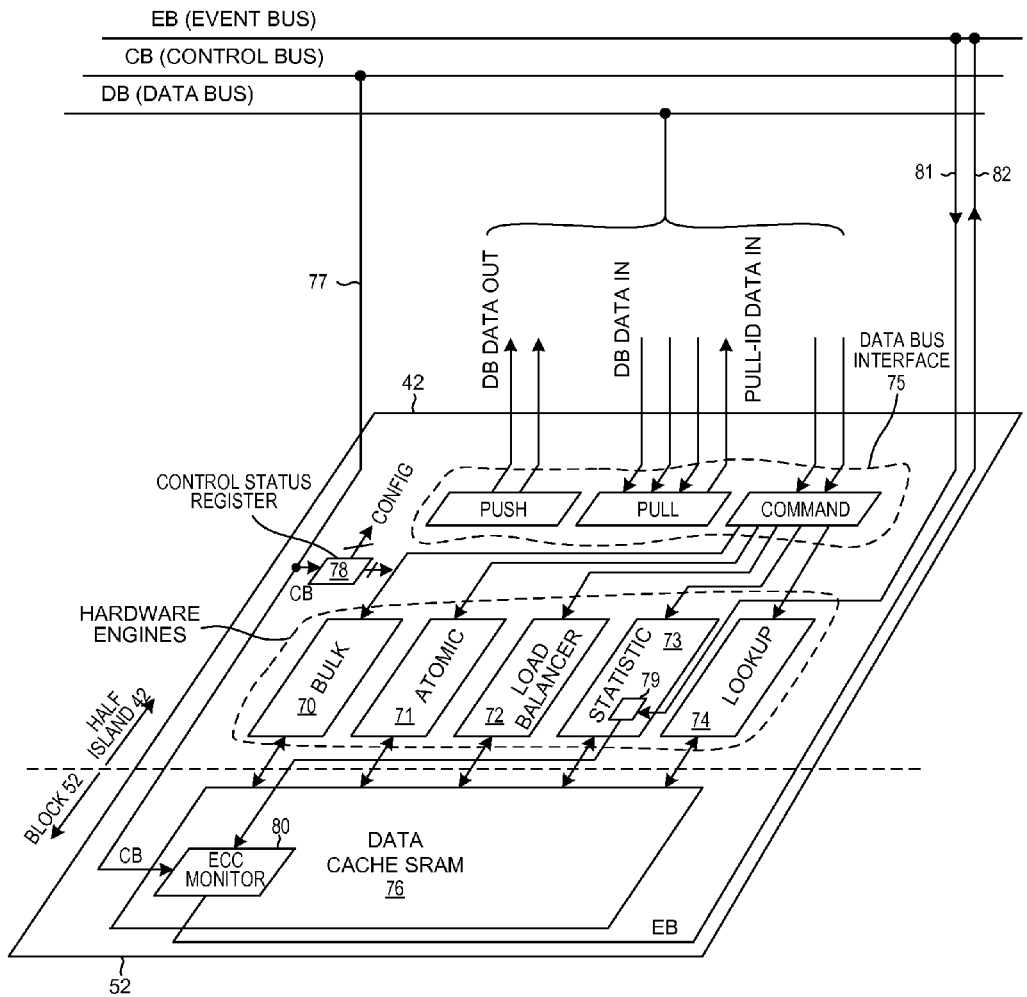
FIG. 10 is a simplified diagram of the memory unit (MU) half island 42 and memory unit (MU) block 52 of the IB-NFP integrated circuit of FIG. 1.

MU Island: FIG. 10 is a diagram of MU half island 42 and SRAM block 52. MU half island 42 includes several hardware engines 70-74. In the operational example, fast path packet payloads are DMA transferred directly from ingress NBI island 46 and across the configurable mesh data bus, through data bus interface 75 of half island 42, and into the data cache SRAM 76 of block 52. The ingress NBI DMA engine issues a bulk write command across the configurable mesh data bus to the bulk transfer engine 70. The destination is the MU island 42. The action is bulk write. The address where the data is to be written into the MU island is the address taken out of the appropriate buffer list. The bulk write command received at the MU is a bulk write, so the data bus interface 75 presents the command to the bulk engine 70. The bulk engine 70 examines the command which is a write. In order to perform a write the bulk engine needs data, so the bulk engine issues a pull-id through the pull portion of interface 75, which in turn issues a pull-id back onto the configurable mesh data bus. The DMA engine in NBI island 46 receives the pull-id. Part of the pull-id is a data reference which indicates to the DMA engine which part of the packet is being requested as data. The DMA engine uses the data reference to read the requested part of the packet, and presents that across the data part of the data bus back to bulk engine 70 in MU island 42. The bulk engine 70 then has the write command and the packet data. The bulk engine 70 ties the two together, and it then writes the packet data into SRAM 76 at the address given in the write command. In this way, fast path packet payload portions pass from DMA engine in the ingress NBI island, across the configurable mesh data bus, through the data bus interface 75, through a bulk transfer engine 70, and into data cache SRAM 76 of block 52. In a similar fashion, exception packet payload portions pass from the DMA engine in ingress NBI island 46, across the configurable mesh data bus, through the data bus interface of half island 44, through the bulk transfer engine of half island 44, and through DDR PHYs 21 and 22, and into external memories 6 and 6.

Various parts of MU island 42 are configurable by changing the contents of registers and memory via the control bus CB and connections 77 and control status registers 78. Errors detected on the MU island by circuits 79 and 80 are reported into a local event ring. Event packets from the local event ring are received via input connections 81 and the MU island outputs event packets to the local even ring via output connections 82.

Figure 11:
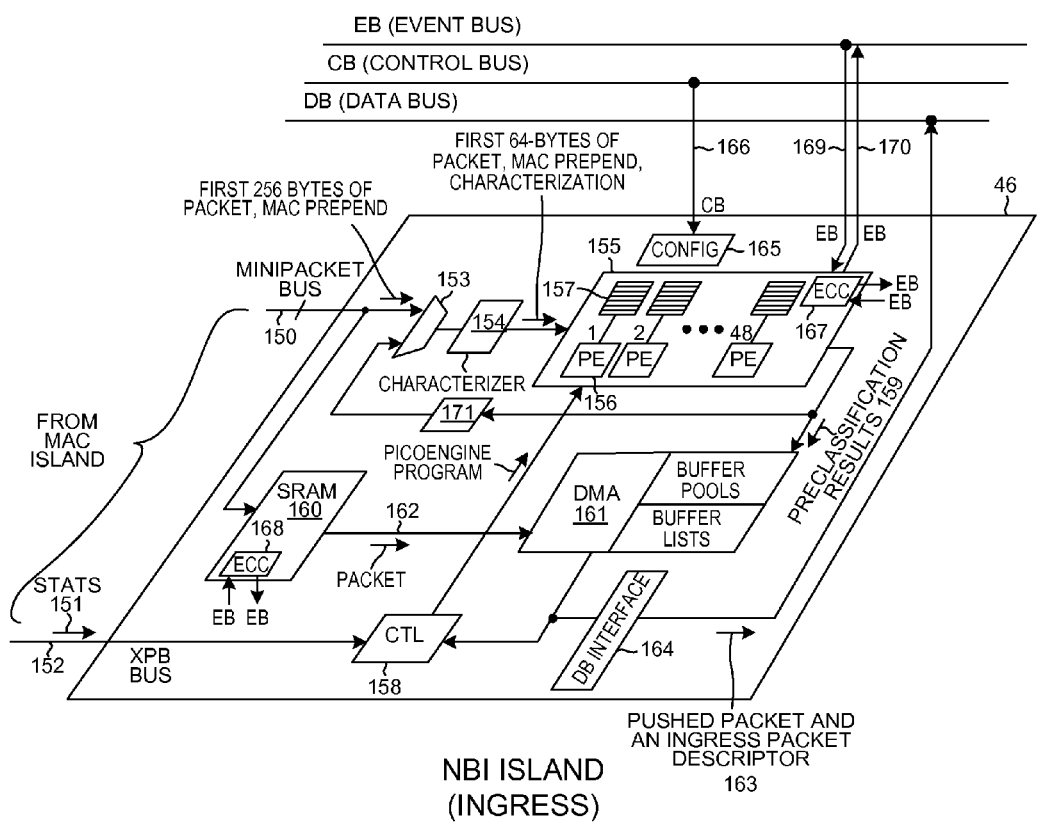
FIG. 11 is a simplified diagram of the Network Bus Ingress (NBI) island 46 of the IB-NFP integrated circuit of FIG. 1.

NBI Island: FIG. 11 is a diagram of ingress NBI island 46. Ingress NBI island 46 receives the MAC prepend and the minipackets via dedicated connections 150 from the ingress MAC island 46. The first 256 bytes of the packet and the MAC prepend pass through multiplexing circuitry 153 and to a characterizer 154. Characterizer 154 outputs characterization information, the first sixty-four bytes of the packet, and the MAC prepend. This is passed to a pool 155 of forty-eight picoengines. Each picoengine executes a program stored in an associated instruction control store. Reference numeral 156 identifies the first picoengine and reference numeral 157 identifies its instruction control store. The program in the instruction control store for each picoengine can be updated and changed under software control via control block 158. Control block 158 is also usable to receive the statistics information 151 from the MAC island via XPB bus connections 152. To perform deeper and deeper analysis into the header structure of an incoming packet, the output of the pool 155 can be passed back through a tunnel recirculation path and tunnel recirculation FIFO 171 to the characterizer 154 in an iterative fashion. Pool 155 outputs preclassification results 159.

Figure 12:
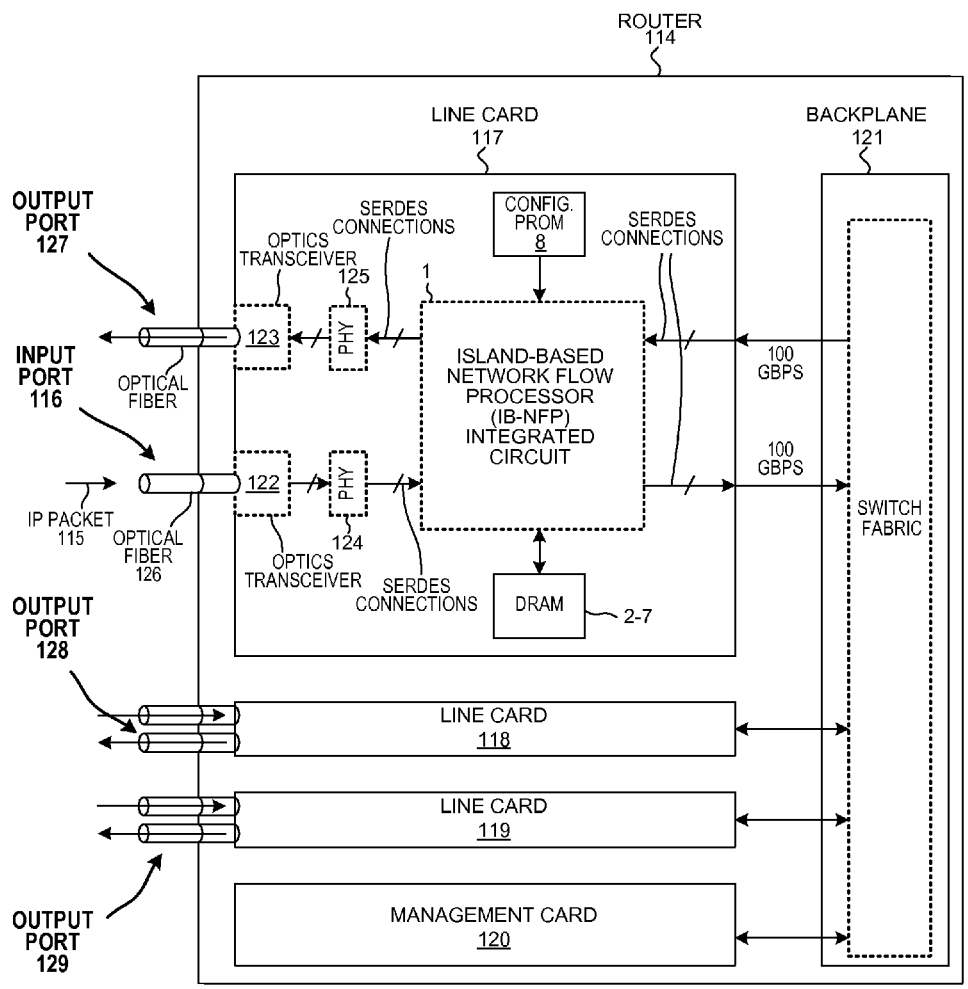
FIG. 12 is a simplified diagram of a router including the IB-NFP integrated circuit of FIG. 1.

FIG. 12 illustrates a router utilizing the Island-Based Network Flow Processor (IB-NFP) integrated circuit 1 of FIG. 2. Router 114 receives an IP packet 115 on an input port of the router. The input port is one of many virtual ports of a physical input port 116. Router 114 includes a plurality of line cards 117-119 and a management card 120 that fit into and attach to a backplane 121. The line cards are identical. Line card 117 includes optics transceivers 122 and 123, PHYs 124 and 125, an instance of the Island-Based Network Flow Processor (IB-NFP) integrated circuit 1 of FIG. 2, configuration PROM 8, and DRAM integrated circuits 2-7. The IP packet 115 is communicated through optical fiber 126, through optics transceiver 122, through PHY 124, and to IB-NFP 1. The IB-NFP 1 in this router looks at the IP destination address of the packet and identifies one of several output ports to which the IP packet is to be routed. The IB-NFP then forwards the IP packet so that the IP packet will be output from the router via the determined output port. In the illustrated example, the output port may be one of many virtual output ports of physical output port 127, or may be one of the many virtual output ports of physical output port 128, or may be one of the many virtual output ports of physical output port 129. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 13:
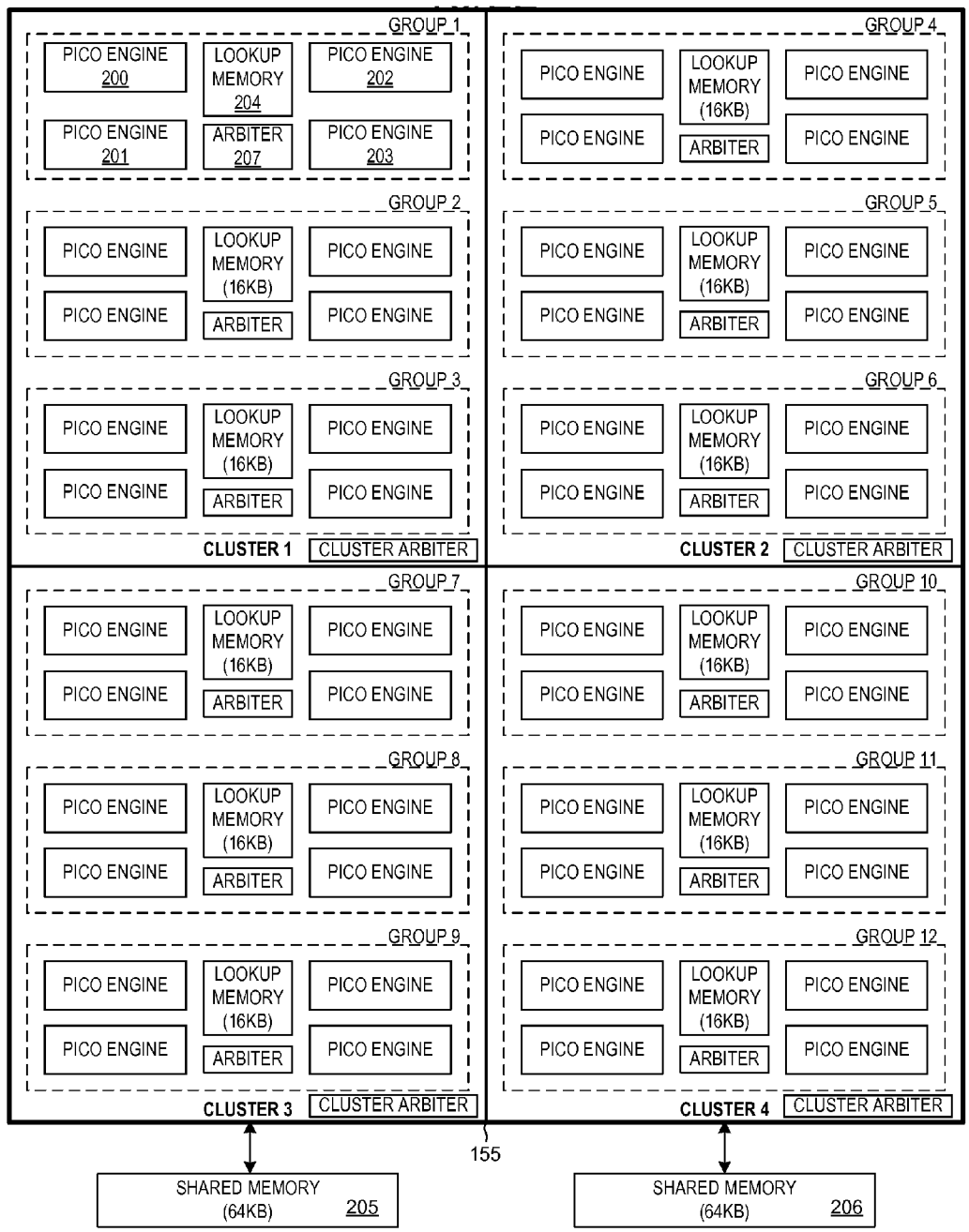
FIG. 13 is a simplified diagram of a Picoengine (PE) pool.

Picoengine Pool: FIG. 13 is a simplified diagram of Picoengine (PE) pool 155. Picoengine pool 155 includes four clusters. Each cluster includes a cluster arbiter and three groups. Each group includes four PEs (processors), a lookup memory (a local transactional memory) and an arbiter. For example, "cluster 1" includes "group 1", "group 2", and "group 3". "Group 1" includes four PEs 200-203, a local memory 204, and a group arbiter. Each group arbiter within a cluster communicates with the cluster arbiter which communicates with the shared memories 205 and 206. Lookup memory 204 has 16 kB of storage space. The picoengine pool includes a shared memory (shared transactional memory). For example, shared memories 205 and 206 are included in the picoengine pool 155 illustrated in FIG. 13. Shared memories 205 and 206 include 64 kB of storage space. All PEs in the picoengine pool can access each shared memory 205 and 206. Alternatively, only PEs with the same group as a local memory can access the local memory. Accordingly, local memories can provide fast access time due to the limited number of PEs the local memory has to serve. For example, local memory 204 can serve data to PEs 200-203 in approximately 4 cycles. On the other hand, shared memories 205 and 206 are required to serve data to all forty eight picoengines and therefore serve data less rapidly. Being external from the picoengine pool 155 allows the shared memories 205 and 206 to have increase storage space. Specific operations require more than the 16 kB of storage space provided by the local memory. To execute these specific operations a PE within the picoengine pool 155 can access shared memories 205 and 206 at a slightly slower data access rate. The PE can execute all other operations by accessing the fast local memory within the PE's group. The numerous picoengines in picoengine pool 155 frequently require access to the same shared resource, such as a local memory or a share memory. It allow efficient operation of each picoengine, a high speed First Come First arbiter is desired.

Figure 14:
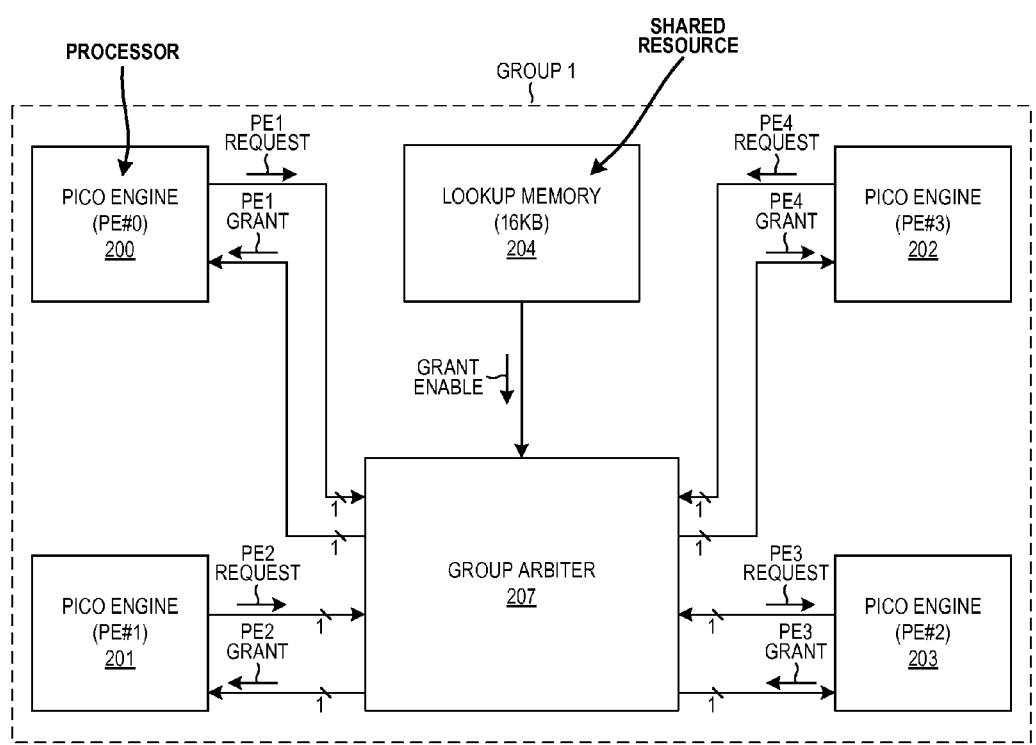
FIG. 14 is an expanded diagram of Group 1 shown in FIG. 13.

FIG. 14 is an expanded diagram of Group 1 shown in FIG. 13. Group 1 includes four picoengines (PE200-203). Each picoengine communicates a request (PE Request) to group arbiter 207 when the source picoengine needs to utilize lookup memory 204. In this example, lookup memory 204 is referred to as a shared resource and picoengines 200-203 are referred to as processors. In response to receiving a request, group arbiter 207 reads a grant enable value from lookup memory 204 returns a grant value to the source picoengine. In one example, the request is a single bit value set to a logic high level when the source picoengine is requesting the shared resource and set to a logic low level when the source picoengine is not requesting the shared resource. In another example, the grant value is a single bit value set to a logic high level when the request to utilize the shared resource is granted and set to a logic low level when the request to utilize the shared resource is not granted. Upon receiving a grant value indicating that the request was granted, the source picoengine that generated the request will begin communicating directly with lookup memory 204 and lookup memory 204 will set grant enable to a logic low level. Once lookup memory 204 has completed serving the source picoengine, lookup memory 204 is set grant enable to a logic high level indicating to the group arbiter 207 that the lookup memory 204 is ready to be allocated to another requesting picoengine.

FIG. 15 is an expanded diagram of Cluster 1 shown in FIG. 13. Cluster 1 includes three groups (Groups 1-3). Each group communicates a request (Group Request) to the cluster arbiter when the source group needs to utilize shared memory 205. In this example, shared memory 205 is referred to as a shared resource and Groups 1-3 are referred to as processors. In response to receiving a request, cluster arbiter reads a grant enable value from shared memory 205 returns a grant value to the source group. In one example, the request is a single bit value set to a logic high level when the source group is requesting the shared resource and set to a logic low level when the source group is not requesting the shared resource. In another example, the grant value is a single bit value set to a logic high level when the request to utilize the shared resource is granted and set to a logic low level when the request to utilize the shared resource is not granted. Upon receiving a grant value indicating that the request was granted, the source group that generated the request will begin communicating directly with shared memory 205 and shared memory 205 will set grant enable to a logic low level. Once shared memory 205 has completed serving the source group, shared memory 205 is set grant enable to a logic high level indicating to the cluster arbiter that the shared memory 205 is ready to be allocated to another requesting group.

FIG. 16 is a diagram of a First Come First Serve (FCFS) arbiter 207 shown in FIG. 13. FCFS arbiter 207 receives four single bit new requests (one from each picoengine PE0-PE3 collocated in Group 1). Each picoengine (PE0-PE3) controls one of the new requests. A picoengine requesting to utilize the shared resource sets its request to a logic high level. A picoengine not requesting to utilize the shared resource sets its request to a logic low level.

FCFS arbiter 207 also receives a grant enable value from a shared resource. In the example shown in FIG. 13, the shared resource is lookup memory 204. The grant enable value is a single bit value that is set to a logic level high by the shared resource when the shared resource is available. Alternatively, the grant enable value is set to a logic low level by the shared resource when the shared resource is not available.

In response to receiving the new requests and the enable value, FCFS arbiter 207 generates and outputs a grant value. The grant value is a four bit value indicating the grant status for each picoengine (PE0-PE3). One of the four bits is associated with one of the four picoengines. When a request is granted, the bit associated with the picoengine that made the request is set to a logic high level. Only one request can be granted in a given cycle, therefore only one of the four bits in the grant value can be set to a logic high level. Each bit of the grant value is communicated to the associated picoengine.

FCFS arbiter 207 includes a storage device 213, a request updater 212, a first set finder 210, and a grant value generator 211.

Storage device includes three request buckets: a "Most Recent Requests" bucket, an "Older Requests" bucket, and an "Oldest Requests" bucket. Each request bucket is four bits wide. Each bit of each request bucket is associated with one of the four picoengines (PE0-PE3). For example, bit 0 of the Most Recent Requests bucket is associated with PE0, bit 1 of the Most Recent Requests bucket is associated with PE1, bit 2 of the Most Recent Requests bucket is associated with PE2, and bit 3 of the Most Recent Requests bucket is associated with PE3. Bits 0-3 for Older Requests bucket and Oldest Requests bucket are similarly allocated.

Figure 17A:
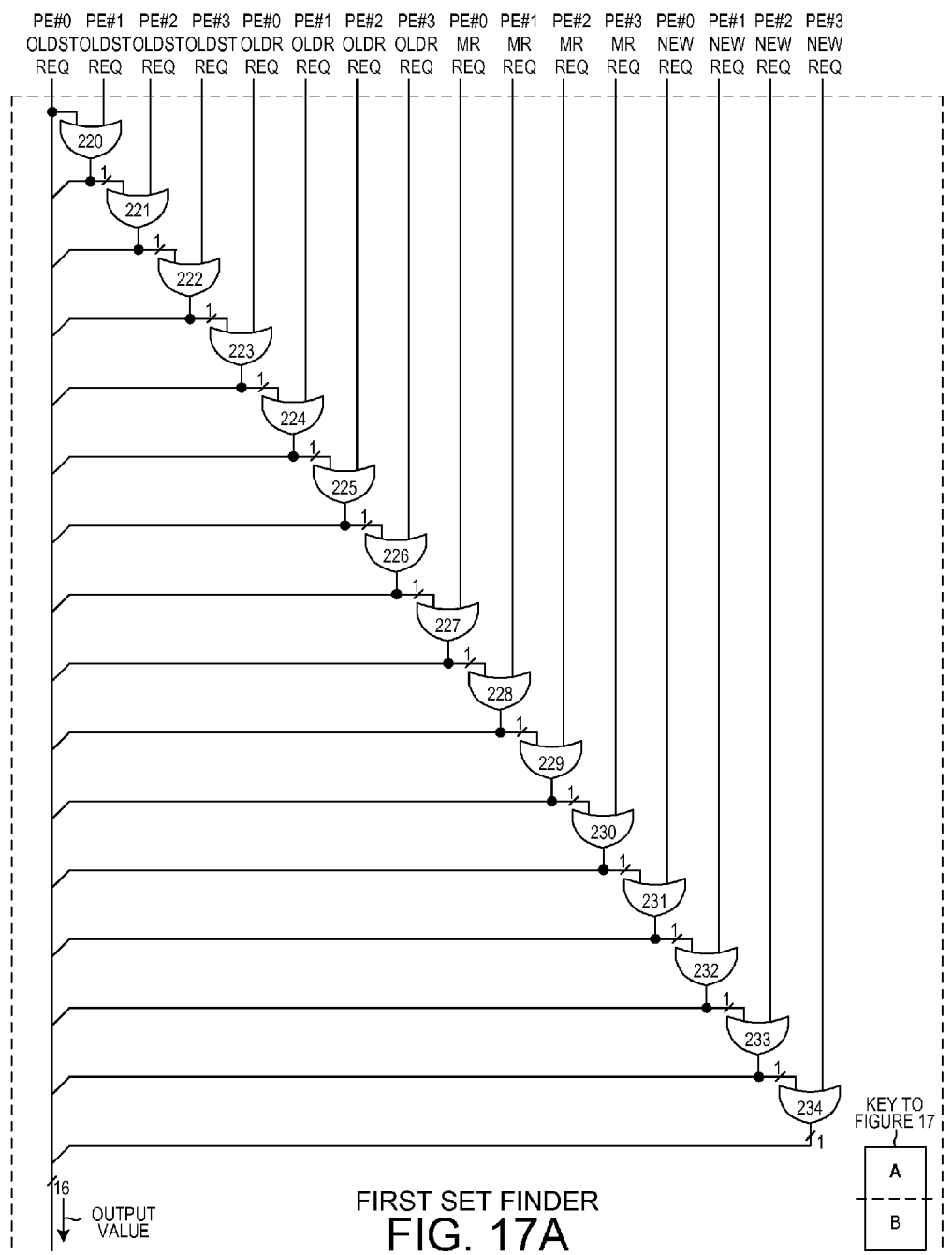
FIG. 17A is a first stage of First Set Finder 210 show in FIG. 16.
Figure 17B:
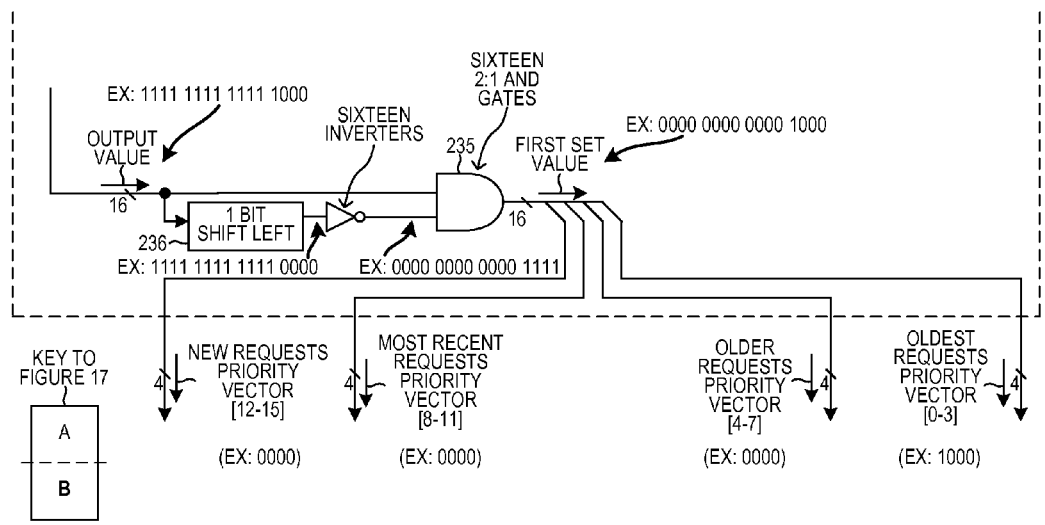
FIG. 17B is a second stage of First Set Finder 210 shown in FIG. 16.

First set finder 210 receives the four new requests ("New Requests"), the four requests from the first request bucket ("Most Recent Requests" bucket), the four requests from the second request bucket ("Older Requests" bucket), and the four requests from the third request bucket ("Oldest Requests" bucket). In response, first set finder 210 generates four individual priority vectors: "New Requests Priority Vector", "Most Recent Requests Vector", "Older Requests Priority Vector", and "Oldest Requests Vector". A detailed description of the operation of the first set finder is illustrated in FIG. 17. FIGS. 17A and 17B together form FIG. 17. FIG. 17A shows all the input requests to first set finder 210 at the top of FIG. 17A. "OLDST REQ" represents a request received from the "Oldest Requests" bucket. "OLDR REQ" represents a request received from the "Older Requests" bucket. "MR REQ" represents a request received from the "Most Recent Request" bucket. "NEW REQ" represents new requests. The cascaded OR gate logic shown in FIG. 17A generates a sixteen bit OUTPUT VALUE that is communicated to a second stage of the first set finder 210. The second stage of the first set finder 210 is illustrated in FIG. 17B. The sixteen bit OUTPUT VALUE is communicated to a first input of 16×16 AND gate 25 and to an input terminal of shift register 236. Shift register 236 is a one bit shift left register. The output of shift register 236 is coupled to an input terminal of a 16-bit inverter. The output of the inverter is coupled to a second input of 16×16 AND gate 25. AND gate 25 outputs a 16-bit wide FIRST SET VALUE. A first four bits of the FIRST SET VALUE are the "Oldest Requests Priority Vector", a second four bits of the FIRST SET VALUE are the "Older Requests Priority Vector", a third four bits of the FIRST SET VALUE are the "Most Recent Requests Priority Vector", and a fourth four bits of the FIRST SET VALUE are the "New Requests Priority Vector."

The following example is provided to further describe the operation of the first set finder 210. In this example, New Requests is "1111", Most Recent Requests is "1101", Older Requests is "1001", and Oldest Requests is "1000". All sixteen of these requests ("1111 1101 1001 1000") are fed to the cascaded OR gate logic shown in FIG. 17A. In response, a 16 bit OUTPUT VALUE is of "1111 1111 1111 1000" is generated. The 16-bit OUTPUT VALUE is then shifted one bit to the left and inverted generating "0000 0000 0000 1111", which is ANDed with the 16-bit OUTPUT VALUE. The result of the AND operation generates the FIRST SET VALUE of "0000 0000 0000 1000." Therefore, it is shown that the single oldest request is selected by the first set finder 210. The "1000" bits are the "Oldest Requests Priority Vector" and all the bits of all the other priority vectors are set to "0". It is noted that only one bit of the FIRST SET VALUE are ever set to "1" at a given time. It is noted that the FIRST SET VALUE is dependent on both the cycle during which each request was received and order in which the requests are ORed together in 17A. In the present example, if all request are set for PE#0-PE#3 in the oldest request bucket, the first set finder will assign the highest priority to PE#0 even if PE#3 was received during the same cycle. Rearranging the order in which PE#0-PE#3 are ORed will change the allocation of the highest priority request when multiple requests are received during the same cycle.

Referring back to FIG. 16, all four output priority vectors ("New Requests Priority Vector", "Most Recent Requests Vector", "Older Requests Priority Vector", and "Oldest Requests Vector") are received by grant value generator 211. Grant value generator 211 includes three 4×4 OR gates 217-219 and 4-bit multiplexer 220. New Requests Priority Vector is coupled to a first input of 4×4 OR gate 217 and Most Recent Requests Priority Vector is coupled to a second input of 4×4 OR gate 217. Older Requests Priority Value is coupled to a first input of 4×4 OR gate 218 and Oldest Requests Priority Vector is coupled to a second input of 4×4 OR gate 218. The 4-bit output of 4×4 OR gate 217 is coupled to a first input of 4×4 OR gate 219. The 4-bit output of 4×4 OR gate 218 is coupled to a second input of 4×4 OR gate 219. The 4-bit output of 4×4 OR gate 219 is coupled to a first input of 4-bit multiplexer 220. A second input to the 4-bit multiplexer 220 is set to a default value of "0000." The GRANT ENABLE value is coupled to a selector input of the 4-bit multiplexer 220. The 4-bit output of the 4-bit multiplexer 220 is the 4-bit GRANT VALUE. The GRANT VALUE is coupled to the request updater 212. Each bit of the GRANT VALUE is associated with one of the four picoengines included in Group 1 shown in FIG. 13. Each bit is also coupled to its associated picoengine.

The following example is provided to further describe the operation of the grant value generator 211. Following the example provided regarding the first set finder 210, "Oldest Requests Priority Vector" is "1000" and all other bits of all the other priority vectors are set to "0". "0000" ORed with "0000" is "0000", therefore the output of 4×4 OR gate 217 is "0000." "0000" ORed with "1000" is "1000", therefore the output of 4×4 OR gate 218 is "1000." "0000" ORed with "1000" is "1000", therefore the output of 4×4 OR gate 219 is "1000." The GRANT ENABLE value can be either "1" if the shared resource is available, or "0" if the shared resource is not available. An illustration of when the shared resource is available is provided in FIG. 22. An illustration of when the shared resource is not available is provided in FIG. 23. When the shared resource is available the GRANT ENABLE value is "1" and the 4-bit multiplexer 220 outputs "1000" from 4×4 OR gate 219. When the shared resource is not available the GRANT ENABLE value is "0" and the 4-bit multiplexer 220 outputs default value "0000." The output of 4-bit multiplexer 220 is the GRANT VALUE. A bit set to "0" in the GRANT VALUE indicates the picoengine associated with that bit is not permitted to utilize the shared resource. A bit set to "1" in the GRANT VALUE indicates the picoengine associated with that bit is permitted to utilize the shared resource. Therefore, the grant value generator only grants a request when the shared resource is available.

The request updater 212 receives the GRANT VALUE and the new requests. In response, the request updater 212 determines if the request buckets need to be updated and how they are to be updated if an update is required. A detailed diagram of request updater 212 is provided in FIG. 18. Request updater 212 includes four portions. Each portion outputs one bit of the first request bucket "Most Recent Requests" bucket, one bit of the second request bucket "Older Requests" bucket, and one bit of the third request bucket "Oldest Request" bucket. Each portion of the request updater 212 receives a 1-bit new request from a single picoengine and the single bit from the GRANT VALUE that is associated with the picoengine. Portion 1 receives a new request from PE0 and the GRANT VALUE bit associated with PE0. Portion 1 controls bit[0] of the first request bucket, bit[0] of the second request bucket, and bit[0] of the third request bucket. Portion 2 receives a new request from PE1 and the GRANT VALUE bit associated with PE1. Portion 2 controls bit[1] of the first request bucket, bit[1] of the second request bucket, and bit[1] of the third request bucket. Portion 3 receives a new request from PE2 and the GRANT VALUE bit associated with PE2. Portion 3 controls bit[2] of the first request bucket, bit[2] of the second request bucket, and bit[2] of the third request bucket. Portion 4 receives a new request from PE3 and the GRANT VALUE bit associated with PE3. Portion 4 controls bit[3] of the first request bucket, bit[3] of the second request bucket, and bit[3] of the third request bucket. The operation of each portion of request updater 212 is similar.

A detailed explanation of the operation of portions 1-4 is illustrated in FIG. 19. The portion illustrated in FIG. 19 includes a 5-input AND gate 240, a 1-bit multiplexer 241, a 2-input AND gate 242, a register 243, a 1-bit multiplexer 244, a 2-input AND gate 245, a register 246, a 1-bit multiplexer 247, a 2-input AND gate 248, and a register 249. PE#0 New request, PE#0 GRANT VALUE, bit[0] of the first request bucket ("Most Recent Requests" bucket), bit[0] of the second request bucket ("Older Request" bucket), and bit[0] of the third request bucket ("Oldest Request" bucket) are coupled to the input terminals of AND gate 240. AND gate 240 operates to only pass in a new request when there are no PE#0 grants stored in any request bucket (i.e. "0" is stored in register 243, j 246, and 249) and when the PE#0 request is not currently granted (PE#0 GRANT VALUE is "0"). All inputs to AND gate 240 are inverted except the new request input. In response, AND gate 240 generates a 1-bit value that is coupled to the "0" input of multiplexer 241. Bit[0] of the first request bucket ("Most Recent Requests" bucket) is coupled to the "1" input of multiplexer 241. Selector signal SEL[0] is coupled to the selector input of multiplexer 241. The output of multiplexer 241 is coupled to a first input of AND gate 242. PE#0 GRANT VALUE is coupled to a second inverting input of AND gate 242. The output of AND gate 242 is coupled to the data input of register 243 (bit[0] of the first request bucket). The output of register is coupled to the "0" input of multiplexer 244. Bit[0] is coupled to the "1" of multiplexer 244. Selector signal SEL[1] is coupled to the selector input of multiplexer 244. The output of multiplexer 244 is coupled to a first input of AND gate 245. PE#0 GRANT VALUE is coupled to a second inverting input of AND gate 245. The output of AND gate 245 is coupled to the data input of register 246. The output of register 246 (bit[0] of the second request bucket) is coupled to the "0" input of multiplexer 247. Bit[0] of the third request bucket is coupled to the "1" input multiplexer 247. Selector signal SEL[2] is coupled to the selector input of multiplexer 247. The output of multiplexer 247 is coupled to a first input of AND gate 248. PE#0 GRANT VALUE is coupled to a second inverting input of AND gate 248. The output of AND gate 248 is coupled to a data input of register 249.

In one situation, the portion of the request updater sets a request to "0". AND gates 243, 246 and 249 perform this function. When PE#0 GRANT VALUE is "1" AND gates 243, 246, and 249 outputs become "0" regardless of what signal is present on their first inputs. Therefore, whenever the PE#0 request is granted the PE#0 GRANT VALUE is set to "1" and any PE#0 request stored in all request buckets is set to "0."

In a second situation, the portion doesn't allow a new value to be shifted into a request bucket. When a selector input to a multiplexer (241, 244, or 247) is set to "1" a new value cannot be shifted into the associated register. For example, when SEL[0] is "1" the PE#0 new request cannot be shifted into register 243, when SEL[1] is "1" the value stored in register 243 cannot be shifted into register 246, and when SEL[2] is "1" the value stored in register 246 cannot be shifted into register 249. However, it is noted that regardless of the selector input values, registers 243, 246, and 249 will be set to "0" whenever PE#0 GRANT VALUE is "1".

In a third situation, the portion allows a new value to be shifted in a request bucket. When a selector input to a multiplexer (241, 244, or 247) is set to "0" a new value is shifted into the associated register. For example, when SEL[0] is "0" the PE#0 new request is shifted into register 243, when SEL[1] is "0" the value stored in register 243 is shifted into register 246, and when SEL[2] is "0" the value stored in register 246 is shifted into register 249. However, it is noted that regardless of the selector input values, registers 243, 246, and 249 will be set to "0" whenever PE#0 GRANT VALUE is "1".

Figure 18:
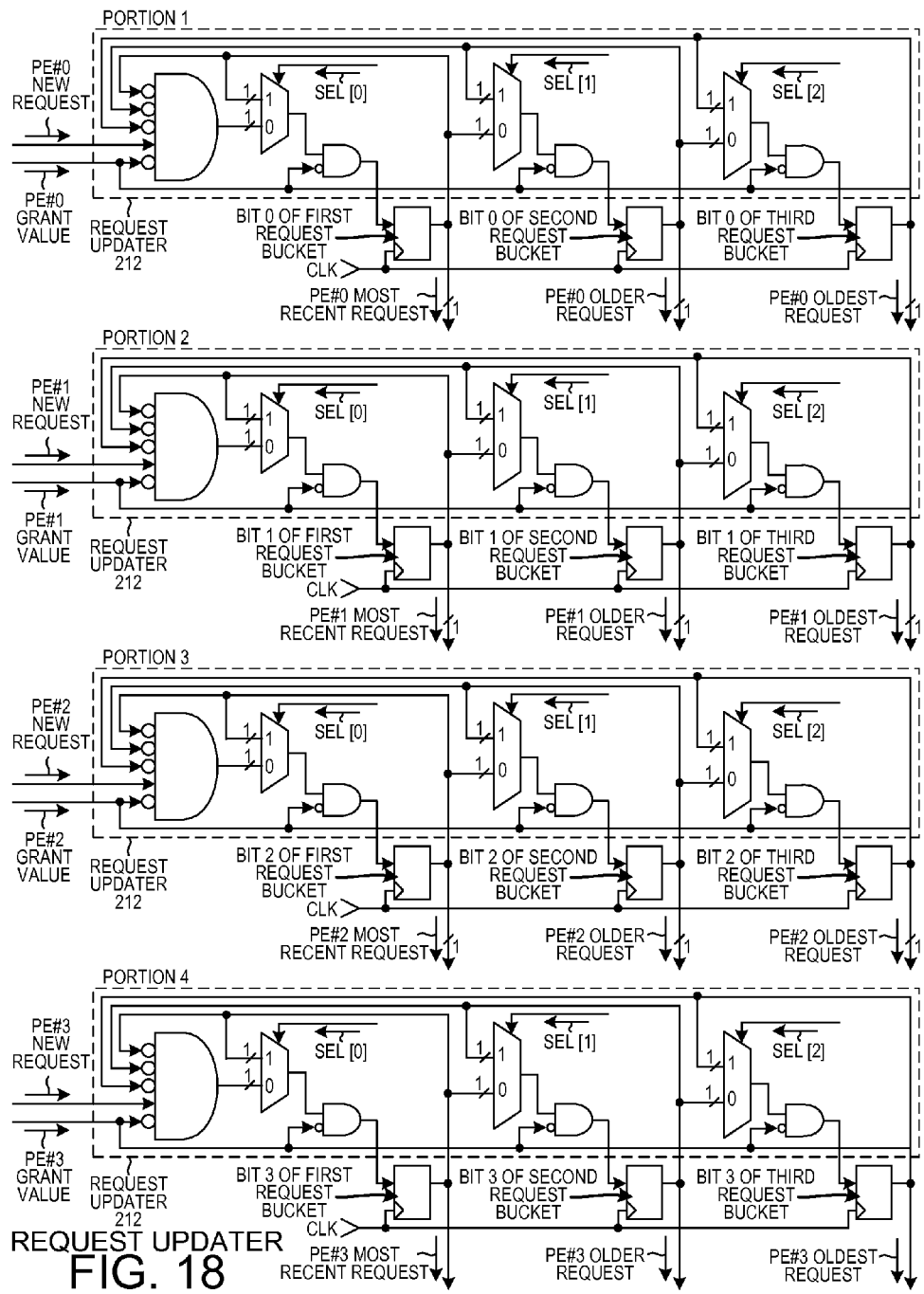
FIG. 18 is a diagram of Request Updater 212 shown in FIG. 16.

FIG. 20 is a table illustrating the logic used to determine the value of SEL[0-2] shown in FIGS. 18 and 19. To provide further understand of this logic, FIG. 21 is provided to illustrate the logic circuit used to generate SEL[0-2]. Select signal generation circuit includes 4-input OR gates 250-252, 2-input AND gate 253, and 3-input AND gate 254. PE#0-3 Oldest Requests are coupled to four individual input terminals of OR gate 250. PE#0-3 Older Requests are coupled to four individual input terminals of OR gate 251. PE#0-3 Most Recent Requests are coupled to four individual input terminals of OR gate 252. The 1-bit output of OR gate 250 is coupled to a first input of AND gate 253 and to a first input of AND gate 254. The 1-bit output of OR gate 251 is coupled to a second input of AND gate 253 and to a second input of AND gate 254. The 1-bit output of OR gate 252 is coupled to a third input of AND gate 254. The 1-bit output of AND get 254 is SEL[0]. The 1-bit out of AND gate 253 is SEL[1]. The 1-bit output of OR gate 250 is SEL[2].

Figure 22:
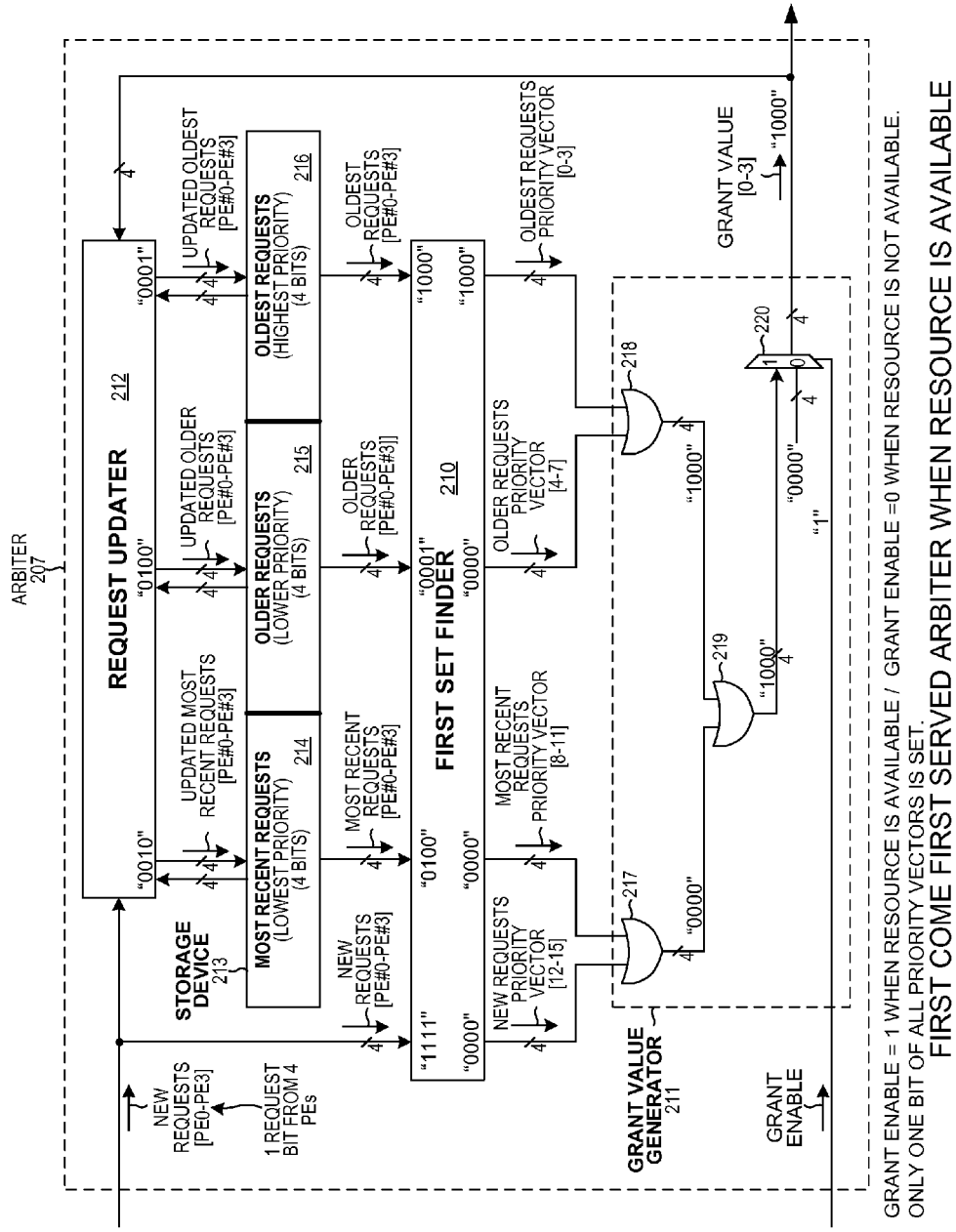
FIG. 22 is a diagram illustrating the operation of First Come First Serve arbiter 207 when the request resource is available.

FIG. 22 illustrates an example when the shared resource is available. In one example, "0100" is stored in the first request bucket ("Most Recent Requests" bucket), "0001" is stored in the second request bucket ("Older Requests" bucket), and "1000" is stored in the third request bucket ("Oldest Requests" bucket). The new requests receives is "1111." First set finder 210 receives all requests and determines which the highest priority request and outputs priority vectors indicating the highest priority request "1000" to grant value generator 211. Grant value generator 211 receives the GRANT ENABLE value of "1" because the shared resource is available. In response, the grant value generator outputs a GRANT VALUE of "1000." The GRANT VALUE "1000" is received by request updater 212. In response, request updater 212 causes "0001" to be stored in the third request bucket ("Oldest Requests" bucket), "0100" to be stored in the second request bucket ("Older Requests" bucket), and "0010" to be stored in the first request bucket ("Most Recent Requests" bucket).

Figure 23:
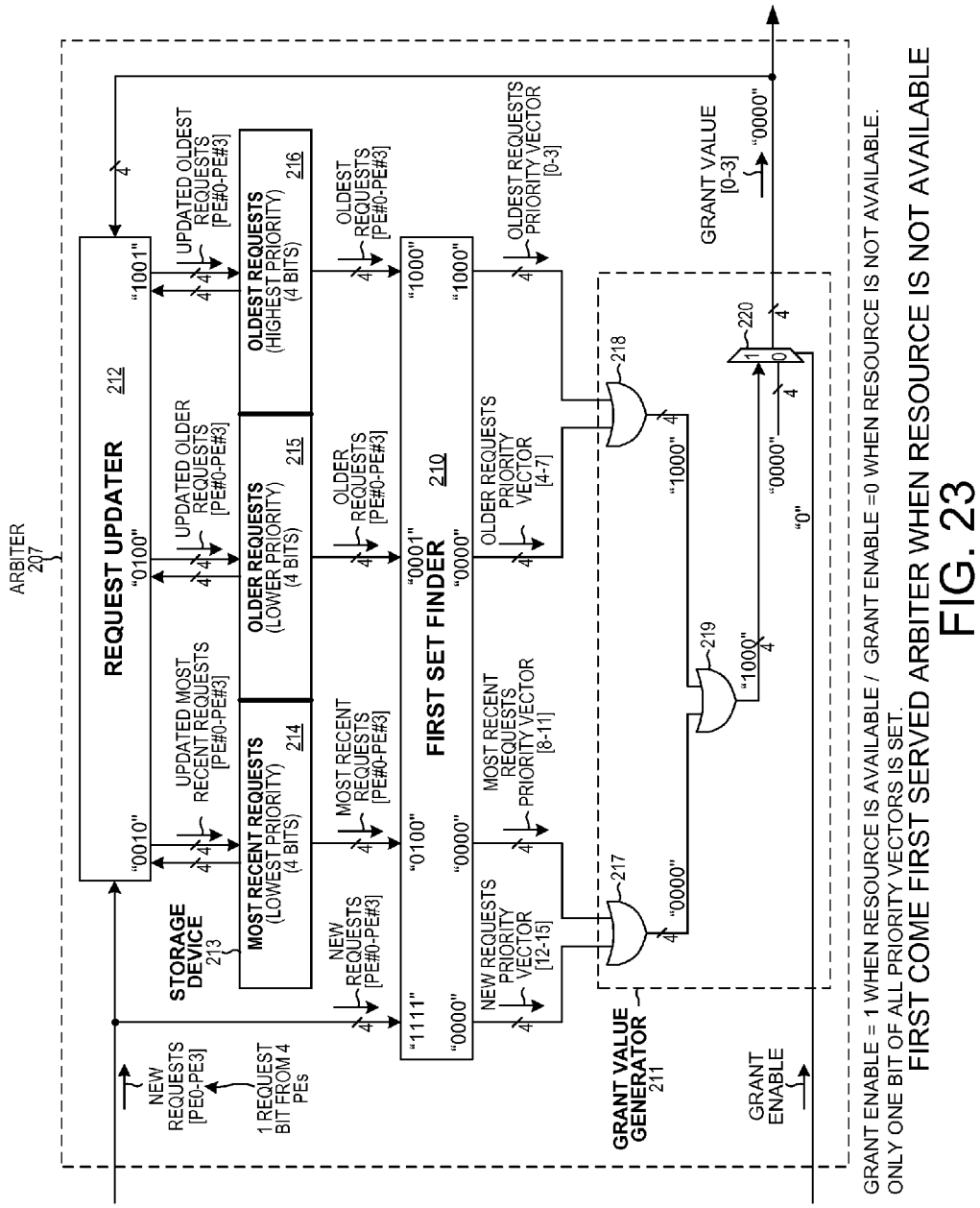
FIG. 23 is a diagram illustrating the operation of First Come First Serve arbiter 207 when the requested resource is not available.

FIG. 23 illustrates an example when the shared resource is not available. In one example, "0100" is stored in the first request bucket ("Most Recent Requests" bucket), "0001" is stored in the second request bucket ("Older Requests" bucket), and "1000" is stored in the third request bucket ("Oldest Requests" bucket). The new requests receives is "1111." First set finder 210 receives all requests and determines which the highest priority request and outputs priority vectors indicating the highest priority request "1000" to grant value generator 211. Grant value generator 211 receives the GRANT ENABLE value of "0" because the shared resource is not available. In response, the grant value generator outputs a GRANT VALUE of "0000." The GRANT VALUE "0000" is received by request updater 212. In response, request updater 212 causes "1001" to be stored in the third request bucket ("Oldest Requests" bucket), "0100" to be stored in the second request bucket ("Older Requests" bucket), and "0010" to be stored in the first request bucket ("Most Recent Requests" bucket).

FIG. 24 is a table illustrating a first example of the flow of requests through the request buckets depending on the availability of the shared resource. FIG. 25 is a table illustrating a second example of the flow of requests through the request buckets depending on the availability of the shared resource.

Figure 26:
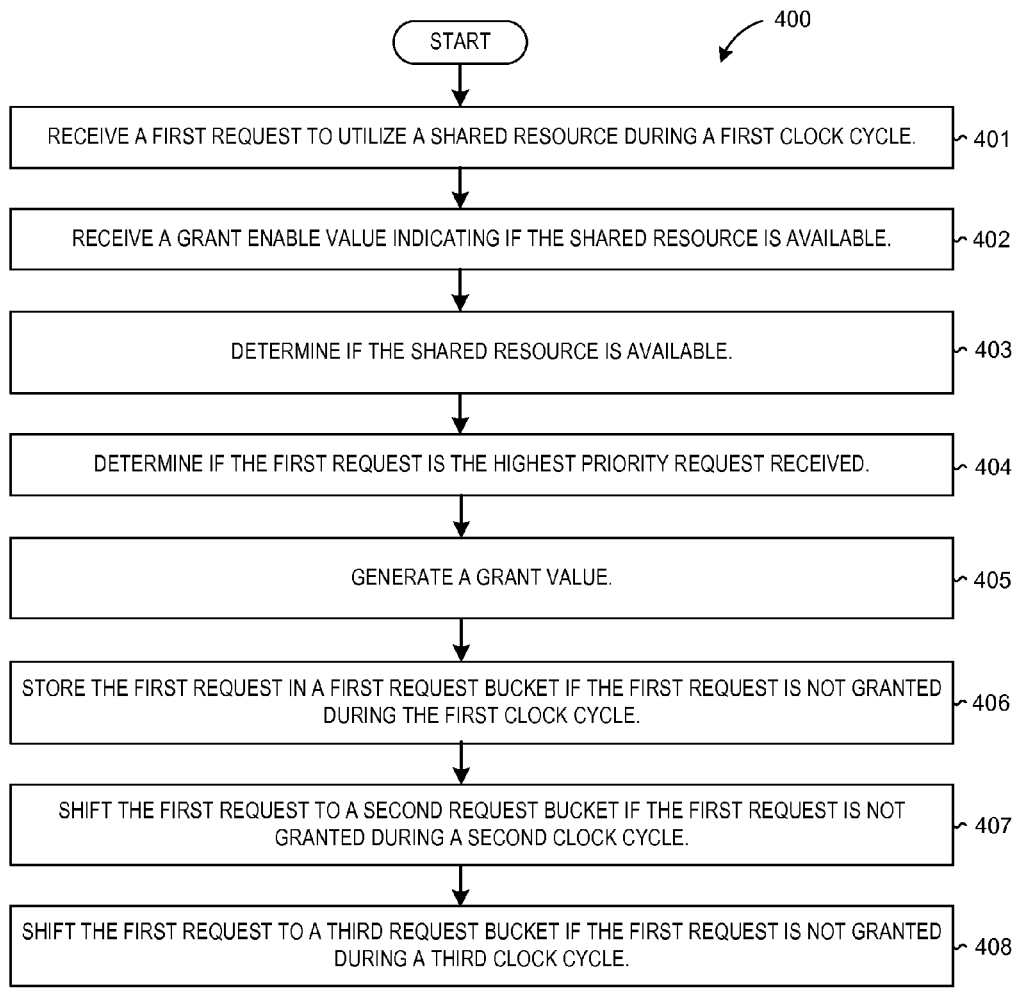
FIG. 26 is a flowchart illustrating the operation of the First Come First Serve arbiter.

FIG. 26 is a flowchart 400 describing the operational flow for a request that not granted within the first three cycles from when the request was received by the arbiter. In step 400, the arbiter receives a first request to utilize a shared resource during a first clock cycle. Then, the arbiter receives a grant enable value indicating if the shared resource is available (Step 402). The arbiter then determines if the shared resource is available (Step 403). In step 404, the arbiter determines if the first request is the highest priority request received. Then, the arbiter generates a grant value (Step 405). In step 406, the arbiter stores the first request in a first request bucket if the first request is not granted during the first clock cycle. In step 407, the arbiter shifts the first request to a second request bucket if the first request is not granted during a second clock cycle. In step 408, the arbiter shifts the first request to a first request to a third request bucket if the first request is not granted during a third clock cycle.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A device, comprising:
  a circuit that receives a first request from a first processor and a grant enable from a shared resource during a first clock cycle and outputs a grant value during the first clock cycle, wherein the grant value is communicated to the first processor and wherein the grant value is based at least on the grant enable indicating that the shared resource is available; and
  a storage device including a plurality of request buckets, wherein the first request is stored in a first request bucket if the first request is not granted during the first clock cycle, whereas the first request is not stored in a first request bucket if the first request is granted during the first clock cycle, and wherein the first request stored in the first request bucket is moved from the first request bucket to a second request bucket if the first request is not granted during a second clock cycle, whereas the first request is not stored in the second request bucket if the first request is granted during the second clock cycle.

2. The device of claim 1, wherein the circuit comprises:
  a first set finder that receives the first request received during the first clock cycle and a second request during a second clock cycle and generates a priority vector;
  a grant value generator that receives the grant enable and the priority vector, and in response generates the grant value; and
  a request updater that receives the grant value and in response moves the first request from the first request bucket to the second request bucket.

3. The device of claim 1, wherein the first request is moved from the second request bucket to a third request bucket when the first request is not granted during a third clock cycle.

4. The device of claim 3, wherein the first cycle occurs before the second cycle, and wherein the first request is granted before the second request is granted.

5. The device of claim 1, wherein the circuit receives a second request during the second clock cycle, wherein the second request is stored in the first request bucket when the second request is not granted during the second cycle.

6. The device of claim 1, wherein the circuit comprises:
  a first set finder that receives the first request received during the first clock cycle and a second request during a second clock cycle and generates a priority vector;
  a grant value generator that receives the grant enable and the priority vector, and in response generates the grant value; and
  a request updater that receives the grant value and in response removes the first request from each of the plurality of request buckets.

7. The device of claim 6, wherein the priority vector indicates a received request that is assigned highest priority, and wherein the priority vector is based at least in part on the clock cycle during which the first request was received and the clock cycle during which the second request was received.

8. The device of claim 6, wherein the priority vector indicates a received request that is assigned highest priority, and wherein the priority vector is based at least in part on the source of the first request and the source of the second request.

9. The device of claim 1, wherein the shared resource is a memory unit, wherein the first request is a single bit value, and wherein the grant value is a multi-bit value indicating if the source of the first request is granted permission to use the shared resource.

10. The device of claim 1, wherein the device does not include or use a counter.

11. The device of claim 1, wherein the device performs a First Come First Serve (FCFS) arbitration operation during a single cycle without fetching instructions from a memory.

12. A method, comprising;
  (a) receiving a first request during a first clock cycle, wherein the first request is to utilize a shared resource and is received from a first processor;
  (b) receiving a grant enable during the first clock cycle, wherein the grant enable is received from the shared resource and indicates if the shared resource is available;
  (c) determining if the shared resource is available;
  (d) determining if the first request is the highest priority request received;
  (e) outputting a grant value to the first processor during the first clock cycle based at least in part on (c) and (d), wherein the grant value indicates if the first request is granted;
  (f) storing the first request in a first request bucket of a storage device during the first clock cycle if the first request is not granted; and
  (g) shifting the first request from the first request bucket to a second request bucket of the storage device during a second clock cycle if the first request is not granted during the second clock cycle.

13. The method of claim 12, further comprising:
  (h) receiving a second request during the second clock cycle, wherein the second request is to utilize the shared resource, and wherein the second clock cycle occurs after the first clock cycle;
  (i) receiving a grant enable during the second clock cycle, wherein the grant enable indicates if the shared resource is available;
  (j) determining if the shared resource is available;
  (k) determining if the second request is the highest priority request received;
  (l) generating a grant value during the second clock cycle, wherein the grant value indicates if the second request is granted based at least in part on (i) and (j); and
  (m) storing the second request in the first request bucket of the storage device during the second clock cycle if the second request is not granted during the second cycle, wherein steps (h) through (m) are performed without use of a counter.

14. The method of claim 13, further comprising:

(n) clearing the second request from each of the plurality of request buckets during a cycle in which the second request is granted.

15. The method of claim 12, further comprising:

(h) clearing the first request from each of the plurality of request buckets during a cycle in which the first request is granted.

16. The method of claim 12, wherein the shared resource is a memory unit, wherein the first request is a single bit value, and wherein the grant value is a multi-bit value indicating if the source of the first request is granted permission to use the shared resource.

17. The method of claim 12, wherein the determining of (d) is based at least in part on during which clock cycle the first request was received.

18. The method of claim 12, wherein the determining of (d) is based at least in part on the source of the first request.

19. The method of claim 12, wherein instructions are not fetched from a memory to perform steps (a) through (f).

* * * * *